United States Patent [19]

Hill et al.

[11] 4,304,464

[45] Dec. 8, 1981

[54] BACKGROUND COMPENSATING INTERFEROMETER

[75] Inventors: Henry A. Hill, Tucson, Ariz.; John W. Figoski, New Town, Conn.; Paul T. Ballard, Tucson, Ariz.

[73] Assignee: The University of Arizona Foundation, Tucson, Ariz.

[21] Appl. No.: 109,632

[22] Filed: Jan. 4, 1980

Related U.S. Application Data

[62] Division of Ser. No. 826,024, Aug. 19, 1977, Pat. No. 4,213,706.

[51] Int. Cl.³ ............................................ G02B 5/00
[52] U.S. Cl. .................................. 350/321; 356/346; 356/353; 356/360

[58] Field of Search ................ 350/168; 356/346, 353, 356/360

[56] References Cited

U.S. PATENT DOCUMENTS 3,698,814  10/1972  Clark ............................. 350/168 X

*Primary Examiner*—John K. Corbin
*Assistant Examiner*—Matthew W. Koren
*Attorney, Agent, or Firm*—Mason, Kolehmainen, Rathburn & Wyss

[57] ABSTRACT

A device for reducing the effects of scattered light in an optical instrument utilizes an interferometer for interfering the scattered light and placing the image of the desired object within a dark fringe of the scattered light interference pattern to increase the contrast between the image of the desired object and the background.

12 Claims, 18 Drawing Figures

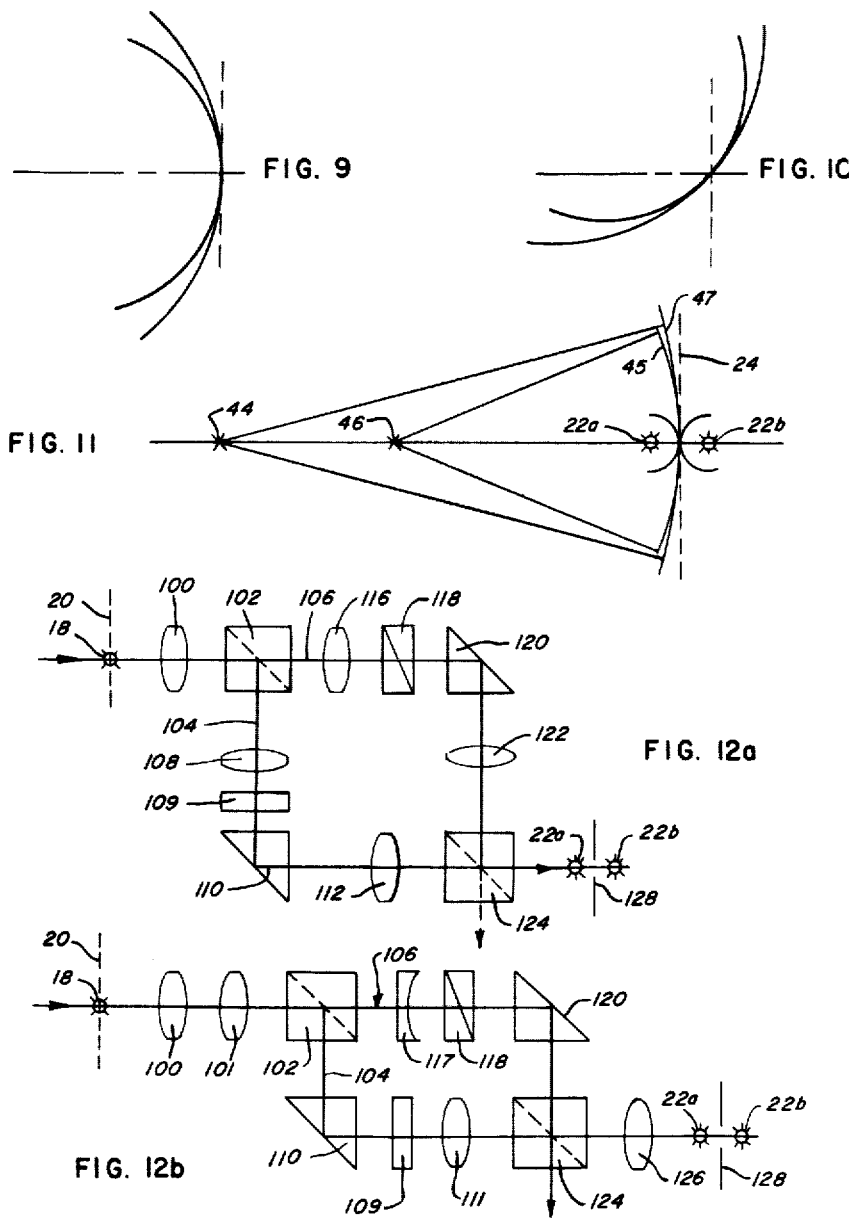

BACKGROUND COMPENSATING INTERFEROMETER

CROSS-REFERENCE TO RELATED APPLICATIONS

This is a divisional patent application of copending patent application Ser. No. 826,024, filed on Aug. 19, 1977 now U.S. Pat. No. 4,213,706.

BACKGROUND OF THE INVENTION

A. Field of the Invention

This invention relates generally to optical instruments, and more particularly, to a device usable for reducing undesired background light resulting from sources of background light that are both internal and external to the optical instruments.

Whenever an object is observed through an optical device, such as a telescope or a microscope, or the like, the image of the object is generally surrounded by a field of unwanted background radiation that occurs as a result of sources internal and external to the optical device. The internal sources of unwanted background radiation include reflection between the optical elements, diffraction by the effective aperture stop of the optical instrument (for a telescope, it is usually the clear aperture of the objective), lens irregularities, such as bubbles and other inclusions, dust and scratches on the lens surfaces, and thermal radiation in infrared work. The major external source of scattered light is the atmosphere, dust and other particles suspended within the atmosphere, and thermal radiation in the infrared.

While in many instances the magnitude of the unwanted background radiation is low relative to the brightness of the image and does not adversely affect the quality of the image, in other instances where the brightness of the desired image is quite low, the background radiation can obscure the image of the object being viewed. Such a problem is particularly acute in astronomic telescopes, particularly when such telescopes are being used either near light generating urban areas, for viewing objects near the periphery of the sun, or for viewing stars in the infrared.

B. Description of the Prior Art

Several methods for reducing internally generated background radiation are known. These include the use of coated optical surfaces to reduce surface reflectivity, the use of a field lens to image the objective lens onto an aperture stop to block out the diffraction ring of the objective lens, the use of an occulting disc within the telescope to eliminate background light produced by multiple reflections and the use of an external occulting disc to block the direct light of the sun before it reaches the instrument.

While these techniques substantially reduce the amount of background radiation produced by the instrument itself, the implementation of such techniques requires extensive modification of the instrument. Moreover, such techniques require the use of apparatus that is costly, cumbersome and requires a high degree of maintenance to assure that the lenses are always kept clean. More importantly, these techniques are not able to affect any reduction in the externally generated background radiation.

Presently, no instruments exist for eliminating externally scattered light optically. The presently known schemes for eliminating externally scattered light utilize techniques where the intensity of the background light at a portion of the field adjacent to the image is sampled and subsequently subtracted from the intensity of the field containing the image of the object under investigation. After a sufficiently long integration time, a weak signal, such as a signal representative of the image of a star, may be pulled from the "noise" resulting from the background light intensity. This image may then be displayed on a cathode ray tube or other display device for viewing.

There are several properties of the above scheme to reduce the effects of background light that should be noted. It is effective only when (1) the background light in one region of the field does not fluctuate rapidly in time with respect to that in an adjacent region and (2) the scale of the spatial structure of the background light in the field is much larger than the scale of the image of the desired object. This poses serious limitations on the value of this technique. There is a further constraint on the utility of such a scheme: since the optical detectors used with such circuitry detect the impact of photons on a photoelectric surface, rather than detecting an incident wave, the amount of reduction in the background noise is limited by the shot noise resulting from the photon detection process. These boundaries represent serious restrictions on the applicability of this technique. Lastly, when such a scheme is applicable, it generally requires complex electronic circuitry, such as a computer to achieve the desired result.

SUMMARY OF THE INVENTION

Accordingly, it is an object of the present invention to provide an improved background light compensating device that overcomes many of the disadvantages of the prior art devices.

It is another object of the present invention to provide a device that optically reduces the background light resulting from sources located within and external to the observing instrument.

It is another object of the present invention to provide a background light compensating device that is simpler and more effective than prior art compensators.

It is another object of the present invention to provide a device that optically reduces the effects of background light resulting from sources internal and external to the observing instrument by splitting the incident light beam into two beams and interfering the two resultant beams to reduce the amplitude of the background radiation in the vicinity of the desired image.

It is another object of the present invention to provide a device that reduces the amplitude of the background radiation through interferometric methods.

It is yet another object of the present invention to provide a device wherein light emanating from a source at any predetermined distance from the observing instrument may be cancelled.

In accordance with a preferred embodiment of the invention, the light beams from an observing instrument is split into two separate beams and diverted along separate optical paths. Optics are provided in each path to shear (preferably radially) one of the light beams with respect to the other. A light combining device, such as a beam splitter or the like, is utilized to recombine the two beams. Lenses are provided to focus the desired object but not scattering sources near the exit focal plane. Consequently, upon recombination of the two beams, the image of the desired object is focused onto a dark fringe of the background light interference pattern at the exit focal plane.

DESCRIPTION OF THE DRAWING

These and other objects and advantages of the present invention may be readily understood from the following detailed description and attached drawing wherein:

FIGS. 9 and 10 illustrate the effects of light from on-axis and off-axis sources impinging on the radial shear interferometer;

FIG. 11 illustrates the wavefronts produced by light emanating from a desired object and background radiation when passed through the background compensator of the present invention;

FIGS. 12a and 12b illustrate two configurations of the optics in the background compensator according to the invention in greater detail;

DETAILED DESCRIPTION OF THE PREFERRED EMBODIMENT

Figure 1:
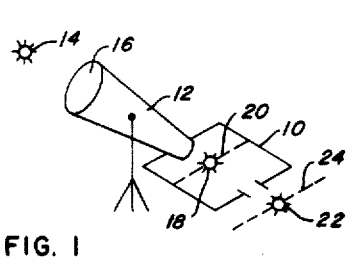
FIG. 1 is a diagram of the background compensator according to the invention used in conjunction with an astronomic telescope.

Referring now to the drawing, with particular attention to FIG. 1, there is shown a background compensator 10 according to the invention used in conjunction with a telescope 12 for viewing a star 14. Although the background compensator 10 is shown in conjunction with an astronomic telescope 12 in FIG. 1, the background compensator 10 may be used with any optical device whenever it is desired to reduce the amplitude of the background radiation relative to the amplitude of the radiation from the desired image. Thus, the background compensator 10 may be used for any application involving the reception of light, including infrared and ultraviolet light, and may find applications, for example, for use in conjunction with tracking telescopes, microscopes, and laser and other optical communications systems. However, for purposes of illustration, the background compensator 10 will be described in conjunction with a telescope in the present specification.

When the telescope 12 is used to view a star, such as the star 14, light emanating from the star 14 is focused by an objective lens 16, and sometimes other lenses, to form an image 18 of the star 14 at a focal plane 20. Thus, the image 18 of the star 14 can be observed by placing an appropriate screen or other target, such as a photo-multiplier, at the focal plane 20. The background compensating device 10 according to the invention refocuses the light from the image 18 to form a second image 22 of the star 14 having reduced background radiation at a focal plane 24.

Figure 2:
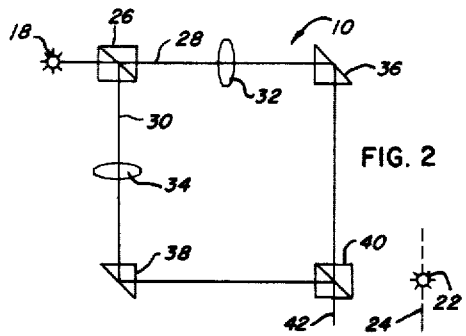
FIG. 2 is a simplified diagram of the optics of the background compensator of the invention.

A simplified version of the background compensator 10 is illustrated in FIG. 2. The compensator 10 utilizes a beam splitting prism 26 for splitting the beam from the image 18 into a pair of light beams 28 and 30. The light beams 28 and 30 pass through lenses 32 and 34, respectively, that serve to introduce a relative shear (radial in the preferred embodiment) between the two light beams 28 and 30. The light beams 28 and 30, respectively, are reflected by a second set of prisms 36 and 38 and recombined in a combining beam splitter 40 to generate the image 22 and an interference pattern resulting from the background radiation. A second light beam 42 consisting primarily of interfering background light exits the system at a direction perpendicular to the light beam forming the image 22.

The device 10 illustrated in FIG. 2 operates on a shearing interferometry principle wherein the wavefront of one of the beams 28 and 30 is sheared slightly with respect to the other and recombined to form an interference fringe pattern. However, for the shearing interferometer to be useful as a background compensator, the device must be able to distinguish between light emanating from the desired source and the background light. In addition, all scattering sources within the viewing angle of the device must be simultaneously compensated, and the device must be a broadband device in order to compensate scattered light over a significant range in frequencies.

The interferometer according to the present invention differentiates between the desired object and the scattering sources by discriminating between the curvatures of the wavefronts emanating from the desired object and the scattering sources. For example, when a star is being observed, the wavefront of the light emanating from the star is essentially planar because of the great distance between the star and the observing instrument. However, the curvature of the wavefront of the light emanating from a scattering object is generally curved since most scattering sources are in much closer proximity to the observing instrument than is the distant star being viewed. This difference in curvatures can be taken advantage of by designing the optics of the interferometer so that wavefronts having the desired curvature are focused near the focal plane 24 forming diffraction patterns contained in a small region while wavefronts having other curvatures are focused at a greater distance from the focal plane 24 forming diffraction patterns with relatively large dark central fringes, i.e., larger than the diffraction patterns of the desired image. Thus, an emhanced contrast results. The wavefront focused near the focal plane 24 need not be the most nearly planar wavefront, as in the case of an astronomical telescope, but the wavefront having the greatest curvature, or an intermediate curvature, may be focused near the focal plane 24. Thus, nearby objects, as in the case of a microscope, or objects at an intermediate distance may be viewed.

Figure 3:
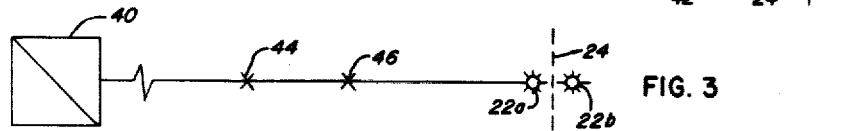
FIG. 3 is a diagram illustrating the image positions produced by the optics shown in FIG. 2 for incident light having wavefronts of various curvatures.

For example, as shown in FIG. 3, the optics of the device may be adjusted to focus the respective star images resulting from the focusing of the beams 28 and 30 into a pair of star images 22a and 22b near the focal plane 24. Preferably, the distance between the images 22a and 22b should be approximately three-fourths of the depth of focus of the overall optical system so as to obtain simultaneously a minimum reduction in spatial resolution and in intensity of the desired image. For all practical purposes, the two images 22a and 22b will appear as a single image of the star at the focal plane 24. The images 22a and 22b need not be on opposite sides of the focal plane 24; however, in the present embodiment, the focal plane 24 is positioned between the two images so that each of the images is focused as close to the focal plane 24 as possible to obtain the best spatial resolution and intensity of the combined images 22a and 22b.

When the optics are adjusted so that the image of the star 14 is positioned near the focal plane 24, the light from a more closely spaced scattering object is focused at a pair of points 44 and 46 more distantly spaced from the focal plane 24 than the images 22a and 22b. Each of the points 44 and 46 corresponds to the image positions of scattered light emanating from a single scattering source, and each scattering source will be focused at a similar pair of image positions, such as points 44 and 46. As in the case of the images 22a and 22b, the images 44 and 46 of the scattering source may be disposed on opposite sides of the focal plane 24. In addition, both images may be positioned on the opposite side (to the right) of the focal plane 24. However, in each case, the images 44 and 46 should be located farther from the focal plane 24 than the images 22a and 22b of the desired object. The last-mentioned condition, that is where the images of the scatterers would be beyond or to the right of the focal plane 24, occurs in a device, such as a microscope, wherein it is desired to view a close-by object having a highly curved wavefront emanating from it and to cancel light emanating from scatterers positioned a greater distance from the device.

Figure 4:
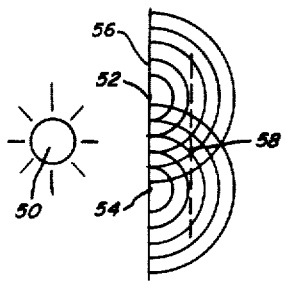
FIG. 4 is a diagram of a known slit interferometer provided to aid in the understanding of the present invention.
Figure 5:
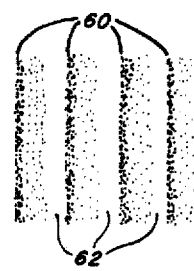
FIG. 5 is a diagram of an interference pattern produced by the interferometer of FIG. 4.

The operation of the device will be better understood with reference to FIG. 4 which illustrates a classical interferometry experiment. A light source 50 emits light that is passed through a pair of narrow slits 52 and 54 formed in a mask 56. The light emanating from each of the slits 52 and 54 interfere and produce the classical interference fringe pattern (FIG. 5) along a plane 58 parallel to the mask 56. The interference pattern results from the alternate reinforcement and cancellation of the amplitudes of the wavefronts emanating from the slits 52 and 54, with dark fringes 60 being created at points where the two wavefronts are out of phase and cancel each other, and the bright fringes 62 occurring at points where the wavefronts are in phase and combine additively.

Figure 6:
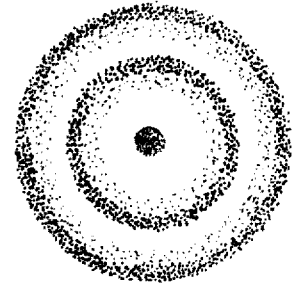
FIG. 6 is a diagram of an interference pattern produced by a radial shear interferometer.

The images 44 and 46 of the scattered light (FIG. 3) are analogous to the light emanating slits 52 and 54 and generate an interference pattern at the focal plane 24. However, the optics of the system are designed to offset the images 44 and 46 axially with respect to each other, rather than laterally as in the case of the slits 52 and 54, in order to generate a bullseye interference pattern (FIG. 6). When such a bullseye pattern is generated, the image 22 of the desired object may be positioned on the central dark fringe of the bullseye to reduce the background radiation immediately around the desired image. Thus, the system according to the invention serves to reduce the background radiation in the vicinity of the desired image be redistributing the background radiation into a series of concentric rings spaced away from the desired image.

Figure 7:
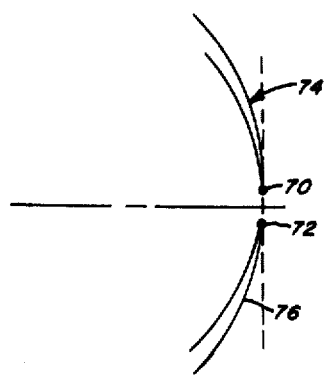
FIGS. 7 and 8 illustrate the effects of light from on-axis and off-axis sources impinging on a lateral shear interferometer.

Although various types of shear may be utilized in the background compensating interferometer, generally a radial shear (different magnification of the two images) is preferable to a lateral shear interferometer. A lateral shear interferometer operates on the two beams 28 and 30 to shift one beam laterally with respect to the other when the beams are combined. An example of lateral shear is illustrated in FIG. 7 which shows two laterally shifted wavefronts each having a desired image 70 and 72 and background radiation 74 and 76. By shifting the phase of the wavefront 74 relative to that of 76, eg. by introducing a 180° phase shift into one of the optical paths, the wavefronts 74 and 76 can be caused to be 180° out of phase in the regions about the desired images 70 and 72. Thus, the wavefronts of the background radiation can be caused to cancel in order to leave the images 70 and 72 superimposed on a dark fringe of the interference pattern of the background radiation.

Figure 8:
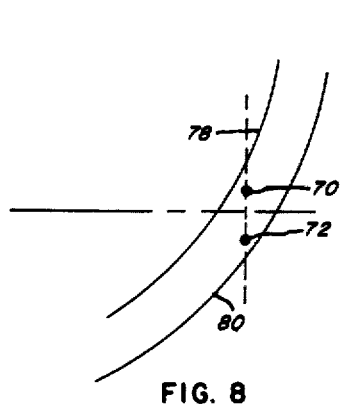

Unfortunately, when lateral shear is used, a dark fringe of the interference pattern of the background radiation can be made to coincide with the desired images only for scattering sources that are positioned along only a single axis with respect to the telescope. For example, if the interferometer were designed to have a dark fringe of the background radiation and the desired image coincide for background radiation emanating from a position along the central axis of the device, cancellation would not occur for light emanating from directions offset from the central axis. Consequently, radiation emanating from sources offset from the central axis can cause a bright fringe to be positioned over the desired image. Such a condition is illustrated in FIG. 8. For the condition illustrated in FIG. 8, the desired images are still positioned at points 70 and 72, but the wavefronts 78 and 80 emanating from the off-axis scattering sources have been shifted relative to each other. In practice, a typical value for the phase shift is found to be of the order of 180°. Thus, if the additional 180° phase shift is introduced to produce the dark central fringe of FIG. 7, a bright central fringe can result in FIG. 8 in the vicinity of the desired images 70 and 72.

In order to overcome this problem, a radial shear interferometer is utilized instead of a lateral shear interferometer. In a radial shear interferometer, the two interfering wavefronts are optionally processed with different magnifications so that one wavefront diverges more rapidly than the other wavefront (FIG. 9), or so that the image positions are axially displaced (FIG. 11). Thus, the two wavefronts will have different curvatures, and can be made to interfere at the image plane of the desired image. Such interference will result in a bullseye interference pattern similar to the pattern illustrated in FIG. 6, and the central fringe of the interference pattern can be made to be a dark fringe by introducng a 180° phase shift into one of the optical paths.

The advantage of utilizing radial shear rather than lateral shear is that by properly designing the optics of the instrument, the interference pattern of the background radiation is independent of the location of the scattering source with respect to the axis of the instrument. One such design is described in an article by H. A. Hill, P. T. Ballard, J. W. Figoski and T. P. Caudell entitled "Shearing interferometer as an interferometric filter for the reduction of scattered light" appearing in APPLIED OPTICS, Vol. 16, No. 1, pp. 195-201, January, 1977, incorporated herein by reference. For example, as illustrated in FIG. 10, for a scattering source positioned above the axis of the instrument, both of the interfering wavefronts are tilted with respect to the axis; however, the position on the wavefronts where there has been no relative phase shift is the same as it was for a scattering source located along the axis (FIG. 9). Since the location of the fringes of the interference pattern is dependent on the relative phase of the wavefronts, which remains the same in FIGS. 9 and 10, there is little or no shift in the interference pattern as the scattering source is offset from the axis of the instrument.

In order to provide the desired background compensation, the incident light from scattering sources and that from the desired object must be separated and separately processed so that the background radiation is destructively interfered while the desired image is retained. This is accomplished by the lenses previously described in conjunction with FIGS. 2 and 3 which focus the background radiation and the desired image at different locations relative to the focal plane 24.

If, as illustrated in FIG. 11, the images of the background radiation 44 and 46 are displaced from each other and separated by a relatively long distance from the focal plane 24, the curvature of the wavefront from the image 44 will be less than that of the wavefront from the image 46. If the phases of the two beams 28 and 30 (which contain light radiated both from the desired object and background sources) are adjusted so that the wavefronts 45 and 47 of the background radiation (FIG. 11) are 180° out of phase at the intersection of the central portion of the focal plane 24 and the two wavefronts, a bullseye pattern, similar to that illustrated in FIG. 6, having a dark central fringe, will result. The wavefronts of the sources 22a and 22b which have a much smaller radius of curvature will result in a similar, much smaller bullseye pattern positioned within the central fringe of the interference pattern formed by the focused background light sources 44 and 46. Consequently, a very small interference pattern resulting from the focused images 22a and 22b will appear on the central fringe. However, since the images 22a and 22b are separated by approximately ¾ of the depth of focus of the instrument, the interference fringe pattern formed by the sources 22a and 22b will have a characteristic dimension in the focal plane 24 that is not much larger than that of one of the images 22a and 22b.

In a practical instrument, such as the one illustrated in FIG. 12a, a field lens 100 is located preferably near the focal plane 20 of the primary instrument, such as the telescope 12. Thus, the field lens 100 serves to collect light reflected by various scatterers without substantially affecting the image of the desired object, such as the image of the star 14. The light from the field lens 100 is passed to a beam splitting prism 102 which splits the beam from the field lens 100 into a pair of beams 104 and 106. The beam 104 is passed through an auxiliary lens 108, and a phase shifter 109, reflected by a prism 110 and passed through a second auxiliary lens 112. The beam 106 is passed through an auxiliary lens 116, and a phase shifter 118, reflected by a prism 120 and passed through a second auxiliary lens 122. The light beam from the auxiliary lens 122 is then applied to a second beam splitting prism 124 where it is combined with the light beam from the auxiliary lens 112. The images 22a and 22b are focused near an exit pin hole 128 placed near the focal plane of the instrument, while the background radiation from the scattering sources is focused a greater distance away from the exit pin hole 128. The phases of the two beams are adjusted so that a dark fringe of the resultant interference pattern formed by the scattering sources occurs at the exit pin hole. Since the device illustrated in FIG. 12a is symmetrical, any change in optical path length occurring as a result of expansion and contraction will operate equally on both paths, thus causing any such changes to cancel. Also, the symmetrical design will permit the device to operate over a broad frequency spectrum.

An alternate optical configuration is shown in FIG. 12b which can offer some advantages in fabrication over that shown in FIG. 12a. The design in FIG. 12b is identical to that of FIG. 12a except that lenses 108, 112, 116 and 122 have been replaced by two lenses 101 and 126 external to the interferometer and lenses 111 and 117 internal. The simplification in fabrication comes in the requirement that only two relatively weak lenses 111 and 117 need be placed in the interferometer proper.

In accordance with an important aspect of the invention, the phase of the beam 106 must be shifted by 180° relative to the phase of the beam 104 to generate a dark central fringe at the exit pin hole 128. This is accomplished by the phase shifters 109 and 118.

Figure 13:
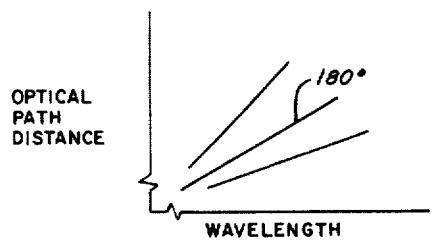
FIG. 13 is a graph illustrating the dependency of optical path difference on wavelength necessary to provide a constant phase shift.
Figure 14:
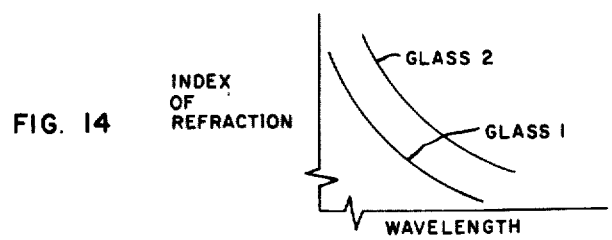
FIG. 14 illustrates the index of refraction versus wavelength dependency of typical optical glass.

One of the requirements for the phase shifters 109 and 118 is that they provide a 180° phase shift between the two beams 104 and 106 over a broad spectrum range, a range which can be centered in either the visible or the infrared. In order to provide such a 180° phase shift over a broad frequency range, the optical path difference between the two beams must be a linear function of wavelength, with the optical path difference increasing linearly with wavelength. FIG. 13 illustrates the optical path difference versus wavelength dependency for a 180° phase shift, for a phase shift greater than 180° (the steeper slope) and for a phase shift less than 180° (the shallower slope). Unfortunately, most glass and other optical material has an index of refraction that decreases with wavelength. Since the velocity of light through a medium is inversely proportional to the index of refraction, the velocity of propagation through the glass increases with wavelength. Thus, the use of a phase shifter fabricated from such a piece of glass would decrease rather than increase the optical path difference as a function of wavelength.

However, since the index of refraction versus wavelength relationship is highly nonlinear and a function of the type of glass used, the proper index of refraction versus wavelength relationship can be synthesized: by using more than one piece of glass and by selecting each piece of glass to obtain certain refraction characteristics, it is possible to arrange that the undesired characteristics are cancelled out and the composite structure has a resultant index of refraction directly proportional to wavelength. Thus, if the phase shifters 109 and 118 are fabricated from glass having compensating characteristics, an optical path distance corresponding to a 180° phase shift can be maintained over the entire spectrum.

The index of refraction and thickness of each of the phase shifters 109 and 118 is readily calculated from the following equation:

$$OPD = (n_1 - 1)t_1 - (n_2 - 1)t_2,$$

where OPD is the optical path difference between the first and second legs of the interferometer, $n_1$ and $n_2$ are the respective indices of refraction (as functions of wavelength) of the glass used in the phase shifters 109 and 118, and $t_1$ and $t_2$ are the respective thicknesses of the phase shifters 109 and 118. Thus, by optimally selecting the values of $n_1$, $n_2$, $t_1$ and $t_2$ the optical path difference OPD can be adjusted to approximate quite accurately a linear function of wavelength as required. The above equation can be readily solved using computer assisted curve fitting techniques and several solutions using standard glass types have been found. One solution giving a linear relation to a root mean square accuracy of 1/120th of the wavelength over a spectral range of $0.4\mu$ to $0.7\mu$ has the following parameters:

Glass 1: KF-9
$t_1 = 4.148 \times 10^2$ microns
Glass 2: LAK-10
$t_2 = 3.011 \times 10^2$ microns Other solutions utilizing standard glasses are also possible.

Figure 15:
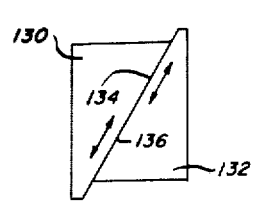
FIG. 15 illustrates a portion of an optical phase shifter used in conjunction with the background compensator of the present invention.

As can be seen from the above parameters, the thicknesses $t_1$ and $t_2$ of the phase shifters 109 and 118 are very critical. In many instances, these tolerances are beyond the manufacturing tolerances possible in glass manufacturing. Accordingly, in accordance with another important aspect of the invention, one or both of the phase shifters 109 and 118 may be fabricated from two wedge shaped pieces of glass 130 and 132 (FIG. 15) having contacting surfaces 134 and 136. The wedge shaped pieces 130 and 132 are mounted to permit lateral movement of the pieces 130 and 132 with respect to each other in a direction illustrated by the arrows. Consequently, by properly positioning the wedge shaped pieces 130 and 132 with respect to each other, the overall thickness between the vertical surfaces of the wedge shaped pieces 130 and 132 can be adjusted to the desired tolerances.

Figure 16:
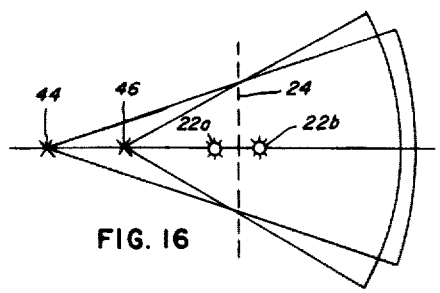
FIG. 16 illustrates the ray pattern of the background radiation in a preferred embodiment of the background compensator according to the invention.

Although one embodiment of the background compensator according to the invention has been described, background compensation may be effected in a variety of ways using various combinations of shear and relative image displacement. For example, the optics of the background compensator described in the foregoing can be adjusted to focus the images 22a and 22b (FIG. 16) near the focal plane 24, to focus the background radiation at the points 44 and 46, and exhibit a magnification in the two branches so that the corresponding rays form images 44 and 46; i.e., rays that initiate as the same ray from the source, intersect at the focal plane 24, as illustrated in FIG. 16. Thus, although the system utilizes a radial shear interferometer, the image plane is positioned at a point where there is no shear. Since there is no shear at this point, wavefront distortions produced by the primary optical instrument, such as the telescope 12 (FIG. 1) and the earth's atmosphere will not degrade the performance of the background compensator.

Figure 17:
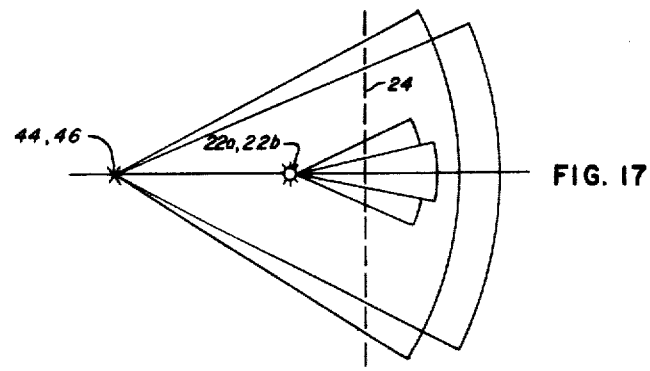
FIG. 17 illustrates the ray patterns of the background radiation and light emanating from a desired object in an alternative embodiment of the background compensator.

In the embodiment illustrated in FIG. 17, there is no axial displacement of the focal points of the images received from the two legs of the interferometer. The images 44 and 46 of the background radiation coincide as do the focal points 22a and 22b of the desired image. In this embodiment, the beam emanating from one leg of the interferometer is phase shifted 180° with respect to the other. A radial shear is introduced into the image of the desired object and the background radiation. The relative transmission of the two legs of the interferometer can be adjusted so that the background radiation will cancel and the image of the desired object will only partially cancel yielding an improved contrast between the desired image and background radiation. In another embodiment, the images of the background radiation and the images of the star can be made to coincide on axis as shown in FIG. 17; however, a lateral shear can be introduced to images of objects appearing off axis which may also yield an improved contrast. Also, the above described technique can be combined in a single instrument to achieve the desired characteristics.

Obviously, many modifications and variations of the present invention are possible in light of the above teachings. Thus, it is to be understood that, within the scope of the appended claims, the invention may be practiced otherwise than as specifically described above.

What is claimed and desired to be secured by Letters Patent of the United States is:

1. An optical phase shifter for adjusting the relative phase of two beams of light while maintaining the relative phase substantially constant over a broad range of frequencies comprising:

a first phase shifter comprising a first sheet of optically transparent material having a first thickness and a first index of refraction that varies as a function of wavelength disposed along the path of said first light beam and operative to shift the phase thereof; and a second phase shifter comprising a second sheet of optically transparent material having a second thickness and a second index of refraction that varies as a function of wavelength in a manner other than that of the first index of refraction disposed along the path of said second light beam and operative to shift the phase thereof, said thicknesses and said indices of refraction being selected in a predetermined manner for maintaining the phase difference between said first and second light beams substantially constant over a predetermined range of frequencies.

2. An optical phase shifter as recited in claim 1 wherein said optically transparent material is glass.

3. An optical phase shifter as recited in claim 1 wherein said first sheet of optically transparent material comprises first and second pieces of optically transparent material, each having a nonuniform thickness, said pieces being disposed adjacent to each other, with at least one of said pieces being laterally movable with respect to the other thereby to alter the thickness of said first sheet.

4. An optical phase shifter as recited in claim 3 wherein said second sheet of optically transparent material has a uniform thickness.

5. An optical phase shifter as recited in claim 1 wherein one of said first and second sheets of optically transparent material includes a piece of optically transparent material having a nonuniform thickness, said nonuniform thickness piece being laterally movable with respect to one of said beams thereby to alter the thickness of said material through which said beam must pass.

6. An optical phase shifter as recited in claim 5, wherein the other one of said first and second sheets of optically transparent material has a uniform thickness.

7. A phase shifter for adjusting the relative phase of two beams while maintaining the relative phase substantially constant over a broad range of frequencies comprising:
- a first phase shifter comprising a first sheet of material substantially transparent to the first beam having a first thickness and a first index of refraction that varies as a function of wavelength disposed along the path of said first beam and operative to shift the phase thereof; and
- a second phase shifter comprising a second sheet of material transparent to the second beam having a second thickness and a second index of refraction that varies as a function of wavelength in a manner other than that of the first index of refraction disposed along the path of said second beam and operative to shift the phase thereof, said thicknesses and said indices of refraction being selected in a predetermined manner for maintaining the phase difference between said first and second beams substantially constant over a predetermined range of frequencies.

8. A phase shifter as recited in claim 7 wherein said transparent material is glass.

9. A phase shifter as recited in claim 7 wherein one of said first and second sheets of transparent material comprises first and second pieces of transparent material, each having a nonuniform thickness, said pieces being disposed adjacent to each other, with at least one of said pieces being laterally movable with respect to the other thereby to alter the thickness of said sheet.

10. A phase shifter as recited in claim 9 wherein the other one of said first and second sheets of transparent material has a uniform thickness.

11. A phase shifter as recited in claim 7 wherein one of said first and second sheets of transparent material includes a piece of optically transparent material having a nonuniform thickness, said nonuniform thickness piece being laterally movable with respect to one of said beams thereby to alter the thickness of said material through which said one beam must pass.

12. A phase shifter as recited in claim 11 wherein the other one of said first and second sheets of transparent material has a uniform thickness.

* * * * *